United States Patent
Koshta et al.

(10) Patent No.: US 11,877,234 B2
(45) Date of Patent: Jan. 16, 2024

(54) NETWORK SLICE SPECIFIC AUTHENTICATION AND AUTHORIZATION (NSSAA) 5G NEW RADIO (NR) PROCEDURES

(71) Applicant: APPLE INC., Cupertino, CA (US)

(72) Inventors: Nirlesh Koshta, Bengaluru (IN); Krisztian Kiss, Cupertino, CA (US); Pradeep Pangi, Bengaluru (IN); Sridhar Prakasam, Cupertino, CA (US); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 166 days.

(21) Appl. No.: 17/593,526

(22) PCT Filed: May 19, 2021

(86) PCT No.: PCT/US2021/033152
§ 371 (c)(1),
(2) Date: Sep. 20, 2021

(87) PCT Pub. No.: WO2021/236766
PCT Pub. Date: Nov. 25, 2021

(65) Prior Publication Data
US 2022/0312307 A1  Sep. 29, 2022

(30) Foreign Application Priority Data
May 22, 2020  (IN) .............................. 202041021588

(51) Int. Cl.
*H04W 48/18*  (2009.01)
*H04W 76/18*  (2018.01)
(Continued)

(52) U.S. Cl.
CPC .............. *H04W 48/18* (2013.01); *H04W 8/12* (2013.01); *H04W 12/068* (2021.01);
(Continued)

(58) Field of Classification Search
CPC ..... H04W 48/18; H04W 8/12; H04W 12/068; H04W 60/04; H04W 60/06; H04W 76/18; H04W 84/042; H04W 8/22; H04W 60/00
(Continued)

(56) References Cited

U.S. PATENT DOCUMENTS 10,327,278 B2  6/2019  Faccin et al.
2017/0311296 A1  10/2017  Onggosanusi et al.
(Continued)

OTHER PUBLICATIONS

Huawei, Hisilicon, "Codebook based transmission for UL MIMO", R1-1715584, 3GPP TSG RAN WG1 NR ad-Hoc#3, Nagoya, Japan, Agenda Item 6.2.1.2, Sep. 18-21, 2017, 10 pages.
PCT/US2021/033152, Invitation to Pay Additional Fees, dated Aug. 24, 2021, 15 pages.
Samsung, "NSSAA for UEs that roam across 5GS VPLMNs", C1-202669, 3GPP TSG-CT WG1 Meeting #123-e, Change Request 24.501 CR 2090 rev 1 current version 16.4.1, Apr. 16-24, 2020, 26 pages.
(Continued)

*Primary Examiner* — Huy C Ho
(74) *Attorney, Agent, or Firm* — Dorsey & Whitney LLP

(57) ABSTRACT

Disclosed are embodiments for disabling N1 mode in response to several scenarios including an S-NSSAI failure, searching NR PLMNs after a loss of coverage in an attempt to maintain network slices, and triggering a UE to reattempt authentication of a rejected S-NSSAI when authentication credentials change and the UE either has N1 mode enabled or is camped on LTE PLMN that might be the same as the NR PLMN through which the S-NSSAI was rejected.

14 Claims, 8 Drawing Sheets

(51) Int. Cl.
*H04W 12/06* (2021.01)
*H04W 8/12* (2009.01)
*H04W 60/04* (2009.01)
*H04W 60/06* (2009.01)
*H04W 84/04* (2009.01)

(52) U.S. Cl.
CPC ........... *H04W 60/04* (2013.01); *H04W 60/06* (2013.01); *H04W 76/18* (2018.02); *H04W 84/042* (2013.01)

(58) Field of Classification Search
USPC ........................................................ 370/329
See application file for complete search history.

(56) References Cited

U.S. PATENT DOCUMENTS

2019/0253944 A1* 8/2019 Kim .................. H04W 36/08
2020/0162919 A1* 5/2020 Velev ................ H04W 12/084
2021/0126681 A1  4/2021 Huang et al.

OTHER PUBLICATIONS

Samsung, "NSSAA for UEs that roam across 5GS VPLMNs", C1-202259, 3GPP TSG-CT WG1 Meeting #123-e. Change Request 24.501 CR 2090 rev Current version 16.4.1, Apr. 16-24, 2020, 29 pages.
PCT/US2021/033152, International Search Report of Written Opinion, dated Oct. 19, 2021, 19 pages.

\* cited by examiner

NETWORK SLICE SPECIFIC AUTHENTICATION AND AUTHORIZATION (NSSAA) 5G NEW RADIO (NR) PROCEDURES

TECHNICAL FIELD

This application relates generally to wireless communication systems, and more specifically to Network Slice Specific Authentication and Authorization (NSSAA).

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

3GPP Technical Specification (TS) 23.501 defines Network Function, Slice, and Slice Instance as follows. Network Function: A 3GPP adopted or 3GPP defined processing function in a network, which has defined functional behavior and 3GPP defined interfaces. (Note: A network function can be implemented either as a network element on a dedicated hardware, as a software instance running on a dedicated hardware, or as a virtualized function instantiated on an appropriate platform, e.g., on a cloud infrastructure. Network Slice: A logical network that provides specific network capabilities and network characteristics. Network Slice instance: A set of Network Function instances and the required resources (e.g., compute, storage and networking resources) which form a deployed Network Slice.

NSSAA enables separate authentication and authorization per Network Slice. The trigger of NSSAA is based on subscription information from a UDM and operator policy and may be performed when UE indicates support for the feature. Identification of a Network Slice is done via the Single Network Slice Selection Assistance Information (S-NSSAI). The NSSAI (Network Slice Selection Assistance Information) is a collection of S-NSSAIs.

Disclosed are embodiments for disabling N1 mode in response to several scenarios including an S-NSSAI failure, searching NR PLMNs after a loss of coverage in an attempt to maintain network slices, and triggering a UE to reattempt a rejected S-NSSAI when authentication credentials change and the UE either has N1 mode enabled or is camped on LTE PLMN.

Additional aspects and advantages will be apparent from the following detailed description of embodiments, which proceeds with reference to the accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
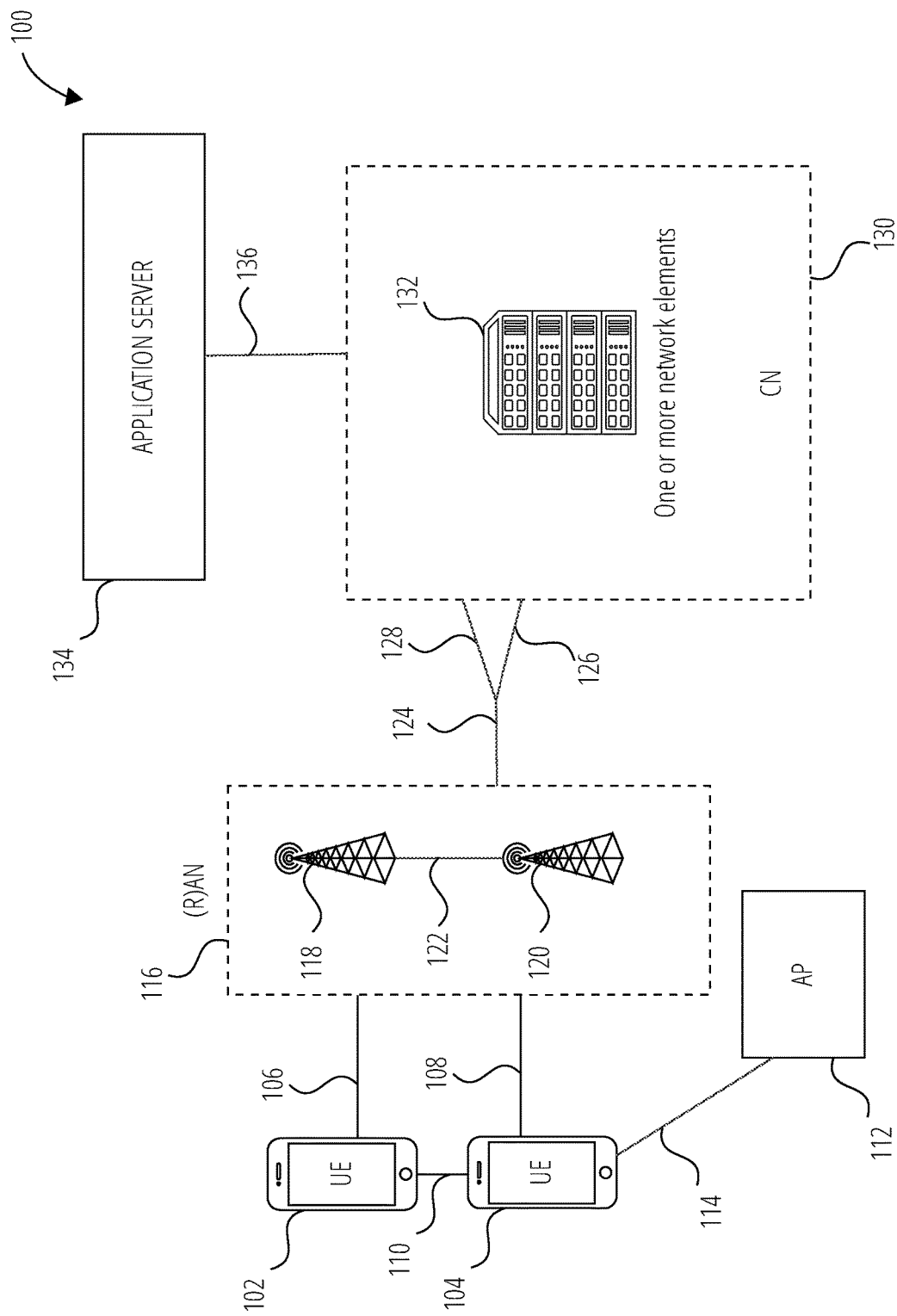
FIG. 1 illustrates a wireless communications system in accordance with one embodiment.

FIG. 1 illustrates an example architecture of a wireless communications system 100 of a network, in accordance with various embodiments. The following description is provided for an example wireless communications system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the wireless communications system 100 includes UE 102 and UE 104. In this example, the UE 102 and the UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 102 and/or the UE 104 may be IoT UEs, which may comprise a network access layer designed for low power IoT applications utilizing short-lived UE connections. An IoT UE can utilize technologies such as M2M or MTC for exchanging data with an MTC server or device via a Public Land Mobile Network (PLMN), ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 102 and UE 104 may be configured to connect, for example, communicatively couple, with an access node or radio access node (shown as (R)AN 116). In embodiments, the (R)AN 116 may be an NG RAN or a 5G RAN, an E-UTRAN, or a legacy RAN, such as a UTRAN or GERAN. As used herein, the term "NG RAN" or the like may refer to a (R)AN 116 that operates in an NR or 5G system, and the term "E-UTRAN" or the like may refer to a (R)AN 116 that operates in an LTE or 4G system. The UE 102 and UE 104 utilize connections (or channels) (shown as connection 106 and connection 108, respectively), each of which comprises a physical communications interface or layer (discussed in further detail below).

In this example, the connection 106 and connection 108 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 102 and UE 104 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 104 is shown to be configured to access an AP 112 (also referred to as "WLAN node," "WLAN," "WLAN Termination," "WT" or the like) via connection 114. The connection 114 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 104, (R)AN 116, and AP 112 may be configured to utilize LWA operation and/or LWIP operation. The LWA operation may involve the UE 104 in RRC CONNECTED being configured by the RAN node 118 or the RAN node 120 to utilize radio resources of LTE and WLAN. LWIP operation may involve the UE 104 using WLAN radio resources (e.g., connection 114) via IPsec protocol tunneling to authenticate and encrypt packets (e.g., IP packets) sent over the connection 114. IPsec tunneling may include encapsulating the entirety of original IP packets and adding a new packet header, thereby protecting the original header of the IP packets.

The (R)AN 116 can include one or more AN nodes, such as RAN node 118 and RAN node 120, that enable the connection 106 and connection 108. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G wireless communications system 100 (e.g., an eNB). According to various embodiments, the RAN node 118 or RAN node 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 118 or RAN node 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 118 or RAN node 120); a MAC/PHY split wherein RRC, PDCP, RLC, and MAC layers are operated by the CRAN/vBBUP and the PHY layer is operated by individual RAN nodes (e.g., RAN node 118 or RAN node 120); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 118 or RAN node 120 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 116 (not shown) or by a server pool in a similar manner as the CRAN/vBBUP. Additionally, or alternatively, one or more of the RAN node 118 or RAN node 120 may be next generation eNBs (ng-eNBs), which are RAN nodes that provide E-UTRA user plane and control plane protocol terminations toward the UE 102 and UE 104, and are connected to an SGC via an NG interface (discussed infra). In V2X scenarios one or more of the RAN node 118 or RAN node 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 118 and/or the RAN node 120 can terminate the air interface protocol and can be the first point of contact for the UE 102 and UE 104. In some embodiments, the RAN node 118 and/or the RAN node 120 can fulfill various logical functions for the (R)AN 116 including, but not limited to, radio network controller (RNC) functions such as radio bearer management, uplink and downlink dynamic radio resource management and data packet scheduling, and mobility management.

In embodiments, the UE 102 and UE 104 can be configured to communicate using OFDM communication signals with each other or with the RAN node 118 and/or the RAN node 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 118 and/or the RAN node 120 to the UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 102 and UE 104 and the RAN node 118 and/or the RAN node 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 102 and UE 104 and the RAN node 118 or RAN node 120 may operate using LAA, eLAA, and/or feLAA mechanisms. In these implementations, the UE 102 and UE 104 and the RAN node 118 or RAN node 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 102 and UE 104, RAN node 118 or RAN node 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 102, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 102 and UE 104. The PDCCH carries information about the transport format and resource allocations related to the PDSCH channel, among other things. It may also inform the UE 102 and UE 104 about the transport format, resource allocation, and HARQ information related to the uplink shared channel. Typically, downlink scheduling (assigning control and shared channel resource blocks to the UE 104 within a cell) may be performed at any of the RAN node 118 or RAN node 120 based on channel quality information fed back from any of the UE 102 and UE 104. The downlink resource assignment information may be sent on the PDCCH used for (e.g., assigned to) each of the UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 118 or RAN node 120 may be configured to communicate with one another via interface 122. In embodiments where the wireless communications system 100 is an LTE system (e.g., when CN 130 is an EPC), the interface 122 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 102 from an SeNB for user data; information of PDCP PDUs that were not delivered to a UE 102; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the wireless communications system 100 is a 5G or NR system (e.g., when CN 130 is an 5GC), the interface 122 may be an Xn interface. The Xn interface is defined between two or more RAN nodes (e.g., two or more gNBs and the like) that connect to 5GC, between a RAN node 118 (e.g., a gNB) connecting to 5GC and an eNB, and/or between two eNBs connecting to 5GC (e.g., CN 130). In some implementations, the Xn interface may include an Xn user plane (Xn-U) interface and an Xn control plane (Xn-C) interface. The Xn-U may provide non-guaranteed delivery of user plane PDUs and support/ provide data forwarding and flow control functionality. The Xn-C may provide management and error handling functionality, functionality to manage the Xn-C interface; mobility support for UE 102 in a connected mode (e.g., CM-CONNECTED) including functionality to manage the UE mobility for connected mode between one or more RAN node 118 or RAN node 120. The mobility support may include context transfer from an old (source) serving RAN node 118 to new (target) serving RAN node 120; and control of user plane tunnels between old (source) serving RAN node 118 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 116 is shown to be communicatively coupled to a core network—in this embodiment, CN 130. The CN 130 may comprise one or more network elements 132, which are configured to offer various data and telecommunications services to customers/subscribers (e.g., users of UE 102 and UE 104) who are connected to the CN 130 via the (R)AN 116. The components of the CN 130 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 134 may be an element offering applications that use IP bearer resources with the core network (e.g., UMTS PS domain, LTE PS data services, etc.). The application server 134 can also be configured to support one or more communication services (e.g., VoIP sessions, PTT sessions, group communication sessions, social networking services, etc.) for the UE 102 and UE 104 via the EPC. The application server 134 may communicate with the CN 130 through an IP communications interface 136.

In embodiments, the CN 130 may be an SGC, and the (R)AN 116 may be connected with the CN 130 via an NG interface 124. In embodiments, the NG interface 124 may be split into two parts, an NG user plane (NG-U) interface 126, which carries traffic data between the RAN node 118 or RAN node 120 and a UPF, and the S1 control plane (NG-C) interface 128, which is a signaling interface between the RAN node 118 or RAN node 120 and AMFs.

In embodiments, the CN 130 may be a SG CN, while in other embodiments, the CN 130 may be an EPC). Where CN 130 is an EPC, the (R)AN 116 may be connected with the CN 130 via an S1 interface 124. In embodiments, the S1 interface 124 may be split into two parts, an S1 user plane (S1-U) interface 126, which carries traffic data between the RAN node 118 or RAN node 120 and the S-GW, and the S1-MME interface 128, which is a signaling interface between the RAN node 118 or RAN node 120 and MMEs.

Figure 2:
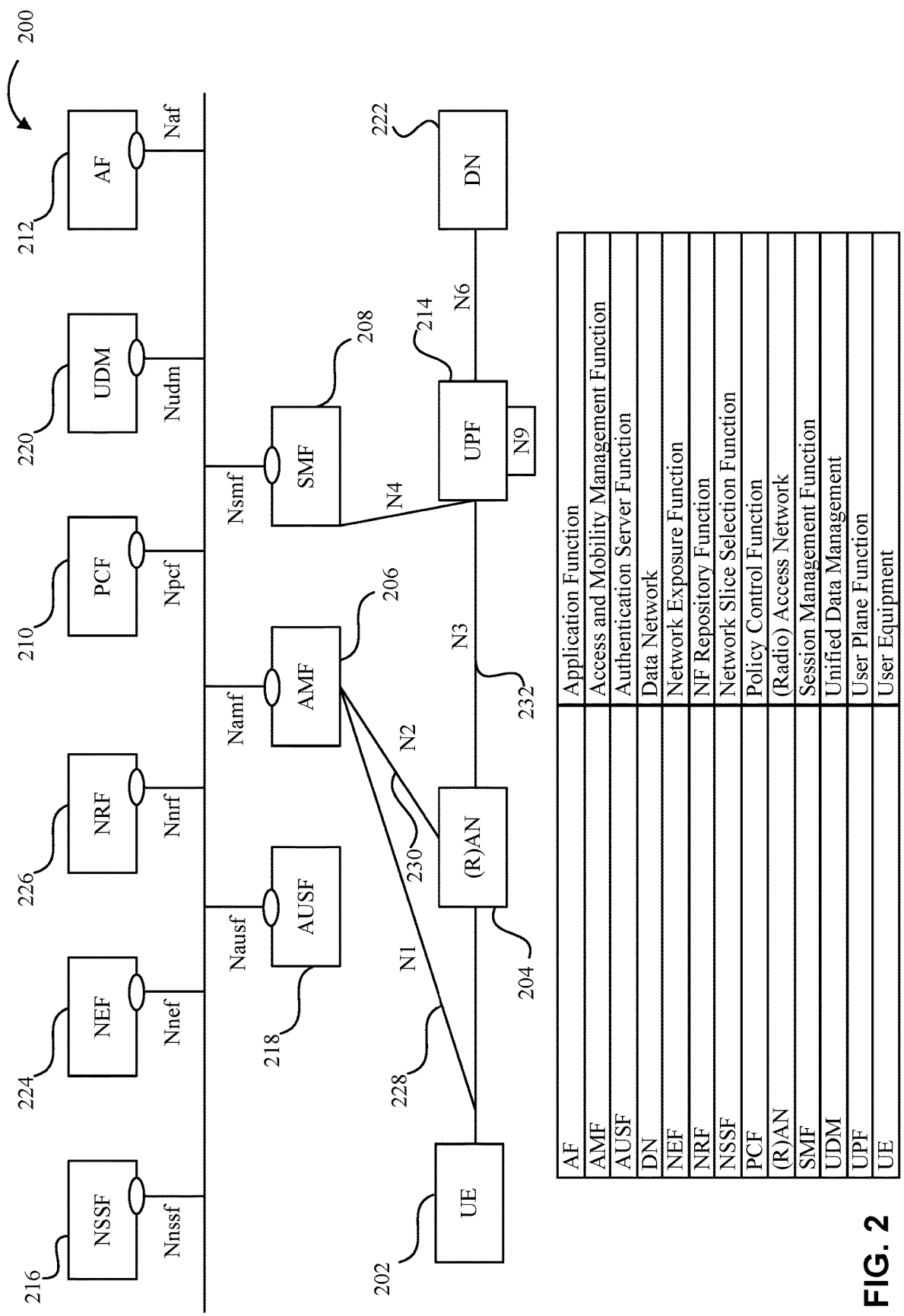
FIG. 2 illustrates a 5G network architecture (non-roaming) in accordance with one embodiment.

FIG. 2 illustrates a 5G system architecture 200 and a service-based representation. A UE 202 can be in communication with a RAN 204 as well as one or more other 5G core (5GC) network entities. 5G system architecture 200 includes a plurality of network functions (NFs), such as an AMF 206, an SMF 208, a PCF 210, an AF 212, a UPF 214, an NSSF 216, an AUSF 218, and a UDM 220/home subscriber server (HSS). UPF 214 can provide a connection to a DN 222, which can include, for example, operator services, Internet access, or third-party services. AMF 206 can be used to manage access control and mobility, and can also include network slice selection functionality. SMF 208 can be configured to set up and manage various sessions according to a network policy. UPF 214 can be deployed in one or more configurations according to a desired service type. PCF 210 can be configured to provide a policy framework using network slicing, mobility management, and roaming (similar to PCRF in a 4G communication system). UDM 220 can be configured to store subscriber profiles and data (similar to an HSS in a 4G communication system).

In addition to the network entities illustrated in FIG. 2, 5G system architecture 200 can also include a NEF 224 and an NRF 226. In some aspects, 5G system architectures can be service-based and interaction between network functions can be represented by corresponding point-to-point reference points Ni or as service-based interfaces. A reference point representation shows that an interaction can exist between corresponding NF services. For example, FIG. 2 illustrates the following reference points: N1 228 (between the UE 202 and AMF 206), N2 230 (between RAN 204 and AMF 206), N3 232 (between RAN 204 and UPF 214), and others. A service-based representations can be used to represent network functions within the control plane that enable other authorized network functions to access their services. In this regard, 5G system architecture 200 can include the following service-based interfaces: Namf (a service-based interface exhibited by AMF 206), Nsmf (a service-based interface exhibited by SMF 208), Nnef (a service-based interface exhibited by NEF 224), Npcf (a service-based interface exhibited by PCF 210), a Nudm (a service-based interface exhibited by UDM 220), Naf (a service-based interface exhibited by AF 212), Nnrf (a service-based interface exhibited by NRF 226), Nnssf (a service-based interface exhibited by NSSF 216), Nausf (a service-based interface exhibited by AUSF 218). Other service-based interfaces can also be used.

As set forth below, the current 3GPP TS 24.501 has some ambiguity in handling of NSSAA procedure for the following example scenarios.

Scenario 1: (1) Default Configured NSSAI in UE are {0, 1, 2} [each number in braces representing a S-NSSAI]; (2) UE is registered on a PLMN which has Configured NSSAI, i.e., {0,1} over 3GPP access and S-NSSAI, {2} on non-3GPP access; and (3) Both S-NSSAIs {0,1} get rejected due to NSSAA failure. As per current handling for this scenario 1, it is not specified on which Access Network UE will move to DEREGISTERED state. Expected behavior for UE in this scenario, is for UE to move to DEREGISTERED state on 3GPP access and move to LTE for 3GPP access and disable N1 mode capabilities over 3GPP access. Besides UE can continue receiving service for S-NSSAI {2} over non-3GPP N1 mode.

Scenario 2: (1) Default Configured NSSAI in UE are {0, 1, 2} [each number in braces representing a S-NSSAI]; (2) UE is camped on a PLMN which has Configured NSSAI, i.e., {0, 1, 2} over 3GPP access, {2} on non-3GPP access; and (3) S-NSSAIs {0, 1, 2} get rejected due to NSSAA failure. As per current handling for this scenario 2, it is not specified on which Access Network UE will move to DEREGISTERED state. Expected behavior for UE in this scenario, is for UE to move to DEREGISTERED state on both 3GPP access and non-3GPP access. UE shall also disable N1 mode for both 3GPP and non-3GPP for the camped PLMN and initiate PLMN search. There is no need for UE to search the same PLMN in N1 mode.

Scenario 3: (1) Default Configured NSSAI in UE are {0, 1, 2} [each number in braces representing a S-NSSAI]; (2) UE is camped on a PLMN which has Configured NSSAI, i.e., {0,1} over 3GPP access and {2} on non-3GPP access;

(3) S-NSSAIs {0,1} get rejected due to NSSAA failure; and (4) AMF triggers CONFIGURATION UPDATE COMMAND indicating a S-NSSAI:2 as deleted. Configured NSSAI is changed to reflect only {0,1}. As per current handling for this scenario 3, handling is not present for this scenario currently in specification. Since both configured NSSAIs have failed NSSAA earlier, UE needs to move to DEREGISTERED state across both 3GPP and non-3GPP and disable N1 mode.

In the above described example scenarios, a UE will be stuck in N1 mode on the same PLMN and cannot initiate any data activities. UE may reselect from S1 to N1 mode needlessly after UE camps on LTE RAT on the same PLMN on which it was camped on N1 mode and on which no slice service is available.

Disabling N1 mode for the camped PLMN in the above-mentioned examples would prevent unnecessary reselection from S1 mode to N1 for the PLMN that had no slice available for the UE.

Besides, based on the UE capabilities (if UE camps on the same PLMN in LTE on which no serving slice services was available in N1 mode), the MME can select the appropriate PGW (PGW-C+SMF or a standalone PGW-C) as indicated in 3GPP TS 23.502 section 4.11.0a.4: PGW selection in LTE for PDN session(s).

Accordingly, N1 mode disabling may be implemented for cases when UE determines that there are no network slices available on the camped PLMN. This includes the cases where #62 "No network slices available" with causes relating to S-NSSAIs—"S-NSSAI not available in the current PLMN or SNPN" or "S-NSSAI not available due to the failed or revoked network slice-specific authentication and authorization" for all configured S-NSSAIs for the PLMN or default S-NSSAIs is received. Accordingly, UE may disable N1 mode without starting any timer. Some embodiments include enforcing the sending of S-NSSAI information in case NSSAA procedure has failed for all allowed S-NSSAIs slices.

Figure 3:
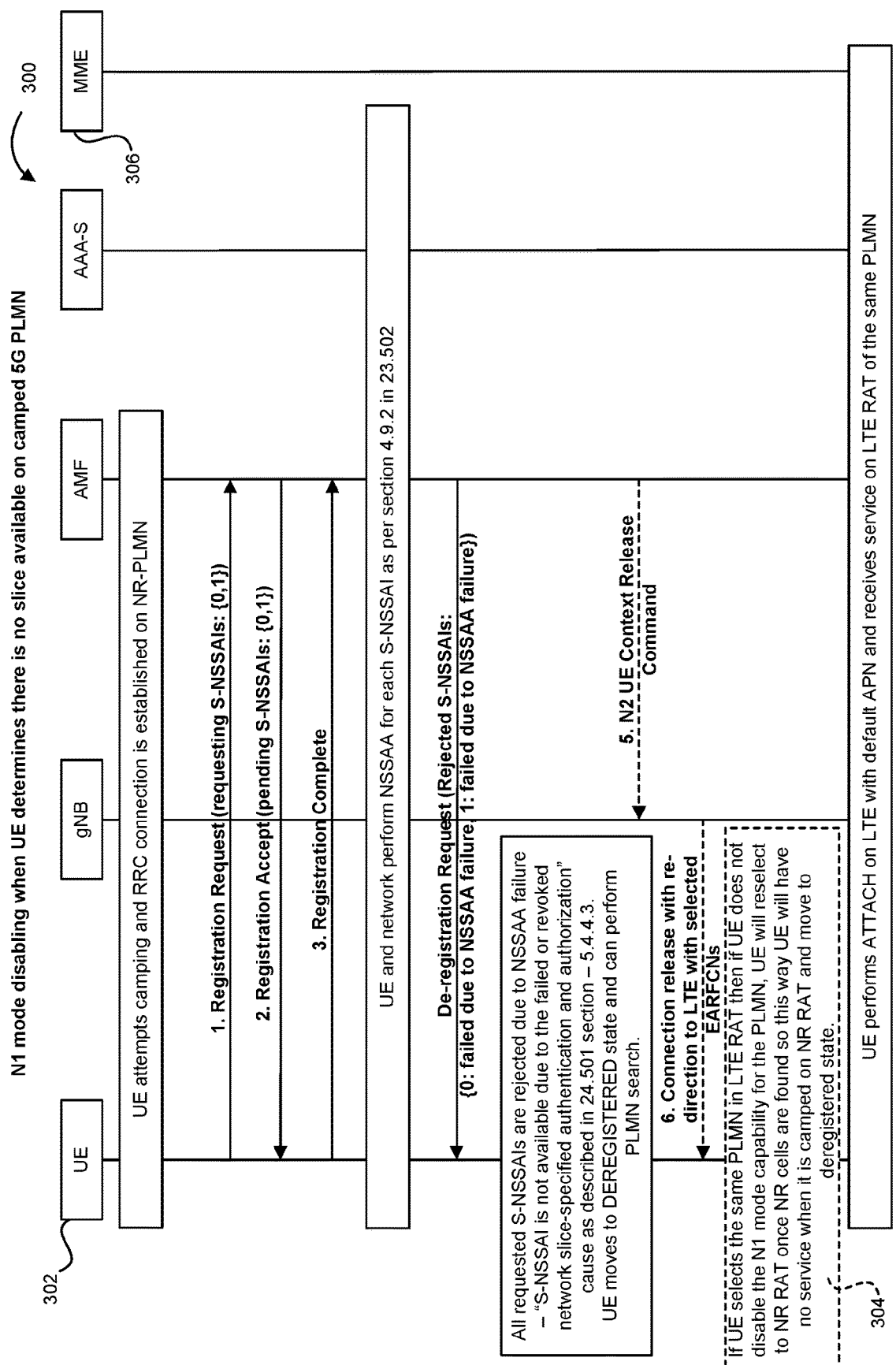
FIG. 3 illustrates a procedure for N1 mode disabling in response to a UE determining there is no slice available on camped 5G PLMN due to NSSAA failure in accordance with one embodiment.

FIG. 3 shows in greater detail example scenario 300 in which each of the requested S-NSSAIs by UE 302 are rejected due to failure of NSSAA procedure. UE 302 is indicated in CONFIGURATION UPDATE COMMAND that all requested S-NSSAIs are rejected with cause—"S-NSSAI not available due to the failed or revoked network slice-specific authentication and authorization." As described above, UE 302 would not be able to activate any service on N1 mode until NSSAA is successful for any one of the rejected S-NSSAIs. Besides gNB, eNB are not aware of the NSSAA failure results hence they will allow re-selection to NR cells. Resulting in UE camping moving to DEREGISTERED state. Thus, UE enters DEREGISTERED state and remains camped on N1 mode. Previously, even if LTE service is available for IMS (voice) or Mobile Broadband, these services will not be availed by UE on LTE, UMTS, GSM RAT of same camped PLMN or perform PLMN search in LTE, UMTS, GSM RATs for other PLMNS.

In contrast, FIG. 3 explains that UE 302 would deactivate 304 N1 mode capability and behaves as per 3GPP TS 24.501 section 4.9 so as to search for PLMNs in LTE, UMTS, GSM, and non-3GPP having EPC core support. (The non-3GPP having EPC core support handling is not mentioned in section 4.9 for generic handling of disabling of N1 mode capabilities say REG ATTEMPT counter reaches max count, but for completeness is contemplated in the present disclosure.) UE 302 disables N1 mode capabilities such that MME 306 can select the appropriate PGW based on this information as indicated in 23.502 section 4.11.0a.4—PGW selection in LTE for PDN session(s)—MME 306 selects PGW-C+SMF or a standalone PGW-C based on this information.

In one embodiment, UE attempts service on LTE on the same PLMN on which all requested S-NSSAIs have failed due to NSSAA. In another embodiment, the camped network provides the redirection information to UE to fallback to LTE RAT. For example, optional steps 4 and 5 show a UE can be redirected immediately to LTE rather than initiating a PLMN search on other RAT if needed. If unsuccessful, UE searches for PLMNs in LTE, UMTS, GSM and non-3GPP having EPC core support as mentioned in 3GPP 24.501 section 4.9.

Because N1 mode is deactivated, UE 302 need not search 5G RAT for the same PLMN, and UE will not perform needless NR RAT cell measurements. Also, UE will not reselect to NR cells or report NR cells during handover. These changes result in saving UE battery and getting early service on suitable PLMN and RAT. Conversely, by not deactivating N1 mode, then when a UE camps on LTE, eRRC may initiate re-selection to NR. This can cause ping pongs LTE and N1. The results is that the UE remains on N1 mode with no service. Hence, it is beneficial to UE that N1 mode capabilities are disabled in this scenario.

Figure 4:
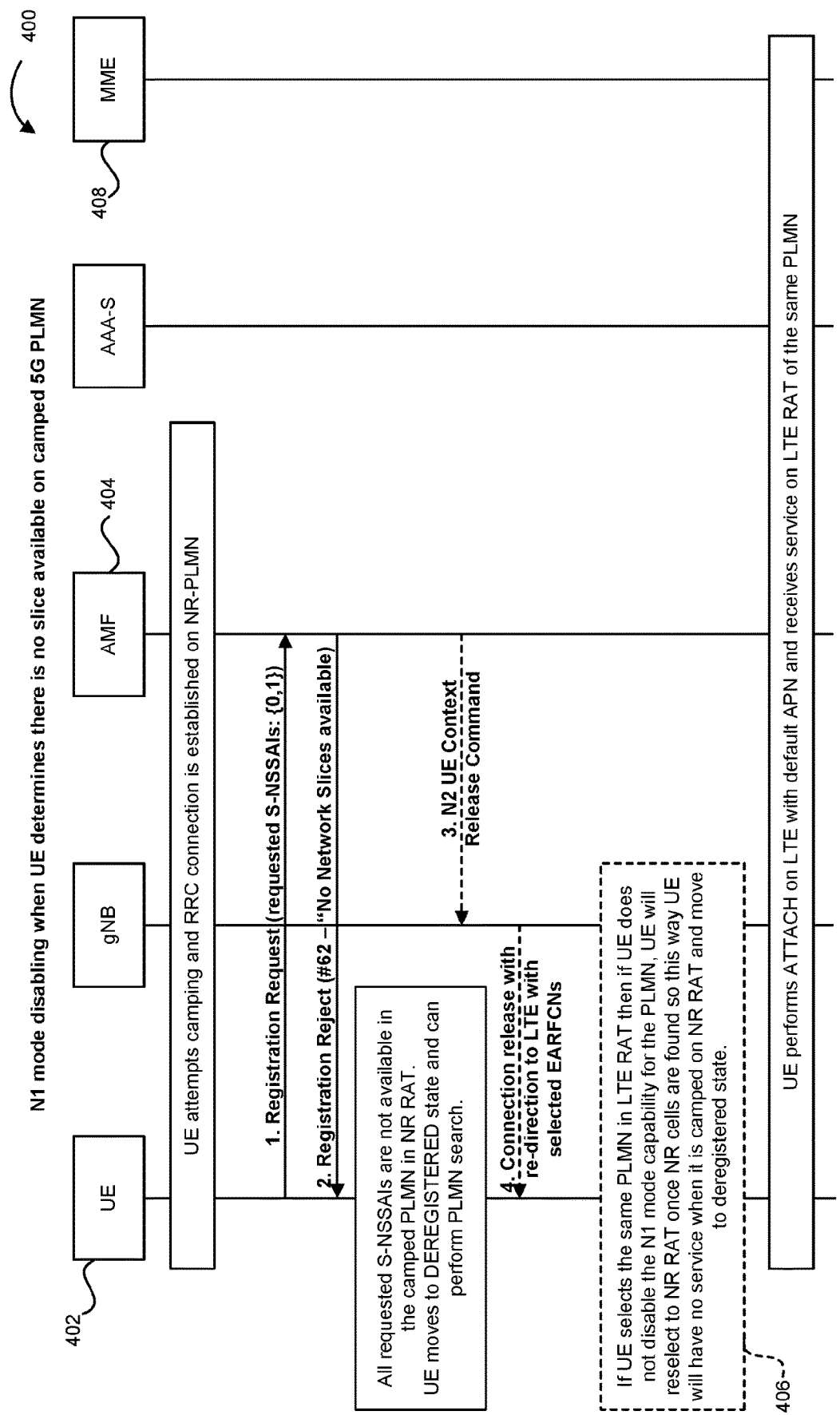
FIG. 4 illustrates a procedure for N1 mode disabling in response to a UE determining there is no slice available on camped 5G PLMN due to no slices available in accordance with one embodiment.

FIG. 4 shows in greater detail example scenario 300 in which each of the requested S-NSSAIs by UE 402 are rejected due to an AMF 404 rejecting UE's REGISTRATION REQ with cause #62—"No network slices available" and rejected S-NSSAIs with cause—"S-NSSAI not available due to the failed or revoked network slice-specific authentication and authorization." The current handling as per specifications is that a UE can search 5G PLMNs as per the following clause in—3GPP TS 24.501 section—5.5.1.2.5.

In contrast, FIG. 4 explains that UE 402 disables 406 N1 mode capabilities because as per this information, MME 408 can select the appropriate PGW based on this information as indicated in 23.502 section 4.11.0a.4—PGW selection in LTE for PDN session(s)—MME 408 selects PGW-C+SMF or a standalone PGW-C based on this information. Also, UE 402 need not reselect to NR cells or report NR cells during handover. Besides gNB, eNB are not aware of the NSSAA failure results hence they will allow re-selection to NR cells. Resulting in UE camping moving to DEREGISTERED state.

Optional steps 3 and 4 of FIG. 4 are shown so that UE 402 can be re-directed immediately to LTE rather than initiating a PLMN search on other RATs if needed.

Figure 5:
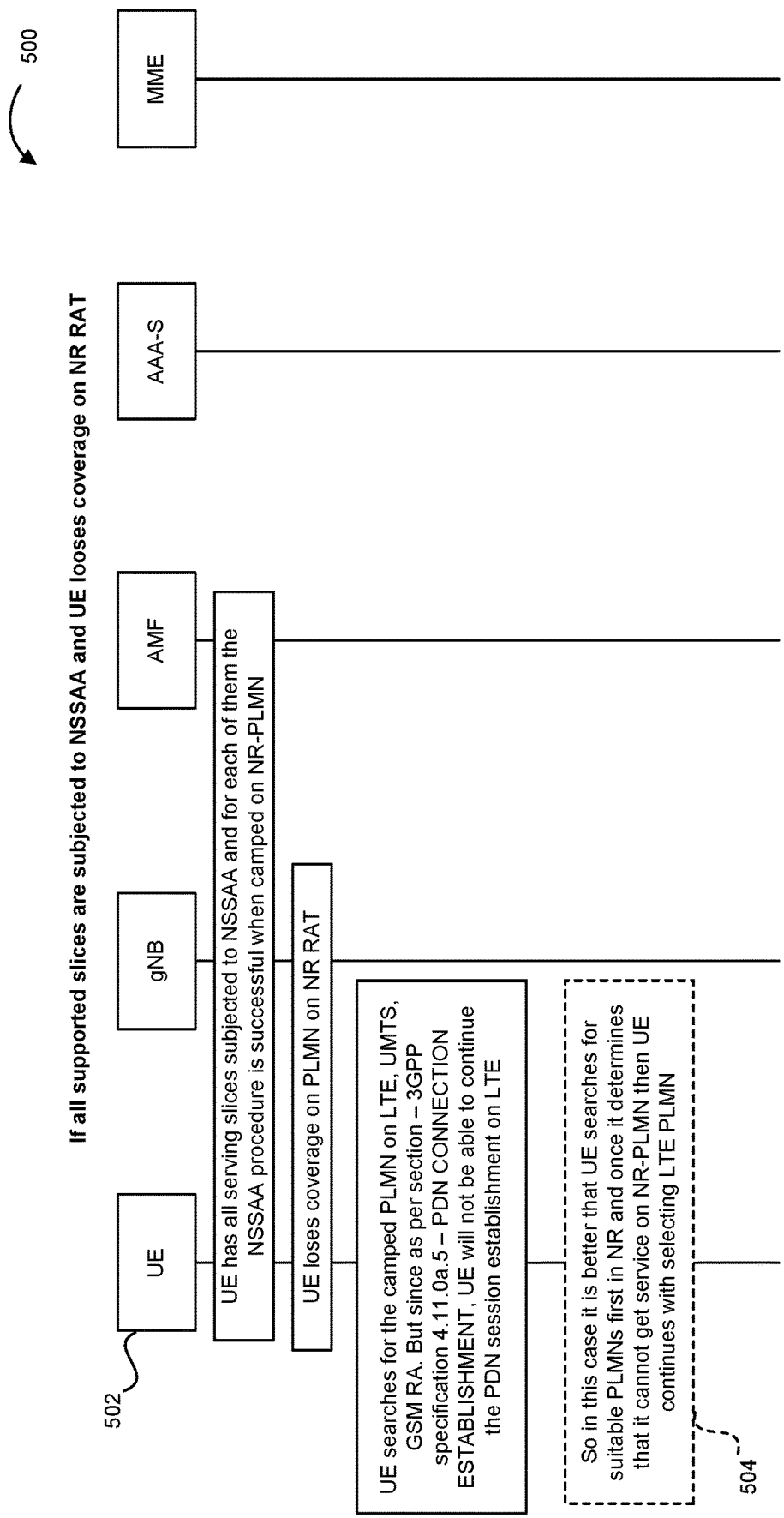
FIG. 5 illustrates a procedure in which a UE loses coverage on NR RAT and the UE searches NR RAT for suitable PLMNs ensures PDU session continuity in accordance with one embodiment.

FIG. 5 shows another example scenario 500 in which the initial condition is that each of the active S-NSSAIs in a UE 502 have been authenticated using NSSAA procedure on a 5G NR roaming PLMN. UE 502 loses coverage on camped and registered 5G NR roaming PLMN. The current handling as per specifications is that a UE will not differentiate during service loss between RATs of the same roaming PLMN. So once UE loses coverage on 5G NR on roaming PLMN it will by default search for same roaming PLMN in LTE. Since NSSAA is not supported on LTE, UE will have to perform ATTACH on LTE and all the existing PDU sessions on 5G NR will be lost. Besides this will also have security implications of activating new PDN sessions corresponding to NSSAA S-NSSAIs in LTE. Further the corresponding S-NSSAIs may not be even supported on LTE due to constraints/limitations on QoS for supporting certain services.

In contrast, FIG. 5 explains that, to address the aforementioned deficiencies, an option is that UE 502 can search 504 other 5G roaming PLMNs searching LTE PLMN(s) so that the same slices can remain active. In other words, UE 502 performs a search NR RAT for suitable PLMNs ensures PDU session continuity which in certain applications can be more important. Thus, UE 502 will have continuity of the existing PDU sessions on N1 mode. This can result in saving UE battery and service continuity for specific slices.

There is some ambiguity in handling of NSSAA procedure for the following scenario in the 24.501, 23.501, and 23.502 specifications: (1) UE is camped on a PLMN which has Configured NSSAI—{0,1}; (2) After initial registration, S-NSSAIs {1} gets rejected due to NSSAA failure and S-NSSAI {0} is activated successfully; (3) User calls the customer care served by the network service provider or the specific slice service provider to activate the slice corresponding to S-NSSAI {1}; and (4) Slice service provider activates the user credentials to access the S-NSSAAI {1}. As per the current handling for this scenario, there is no provision for network how to indicate to the UE that its subscription has changed for a slice and now the NSSAA procedure for S-NSSAI {1} can be re-attempted. In other words, after some time, if the authentication and authorization parameters of a UE are modified at network side for the earlier rejected S-NSSAI due to NSSAA failure, then there is currently no way that a UE can be indicated about this change. Hence, a UE could not reattempt to activate the rejected S-NSSAI. The current handling as per specifications is that the UE will not come to know if there is a change in its subscription information, which could otherwise allow it to access the specific rejected S-NSSAI with NSSAA again. Moreover, the UE cannot remove the previously failed NSSAA slice. A UE may not be able to activate a rejected slice until UE performs power cycle.

Figure 6:
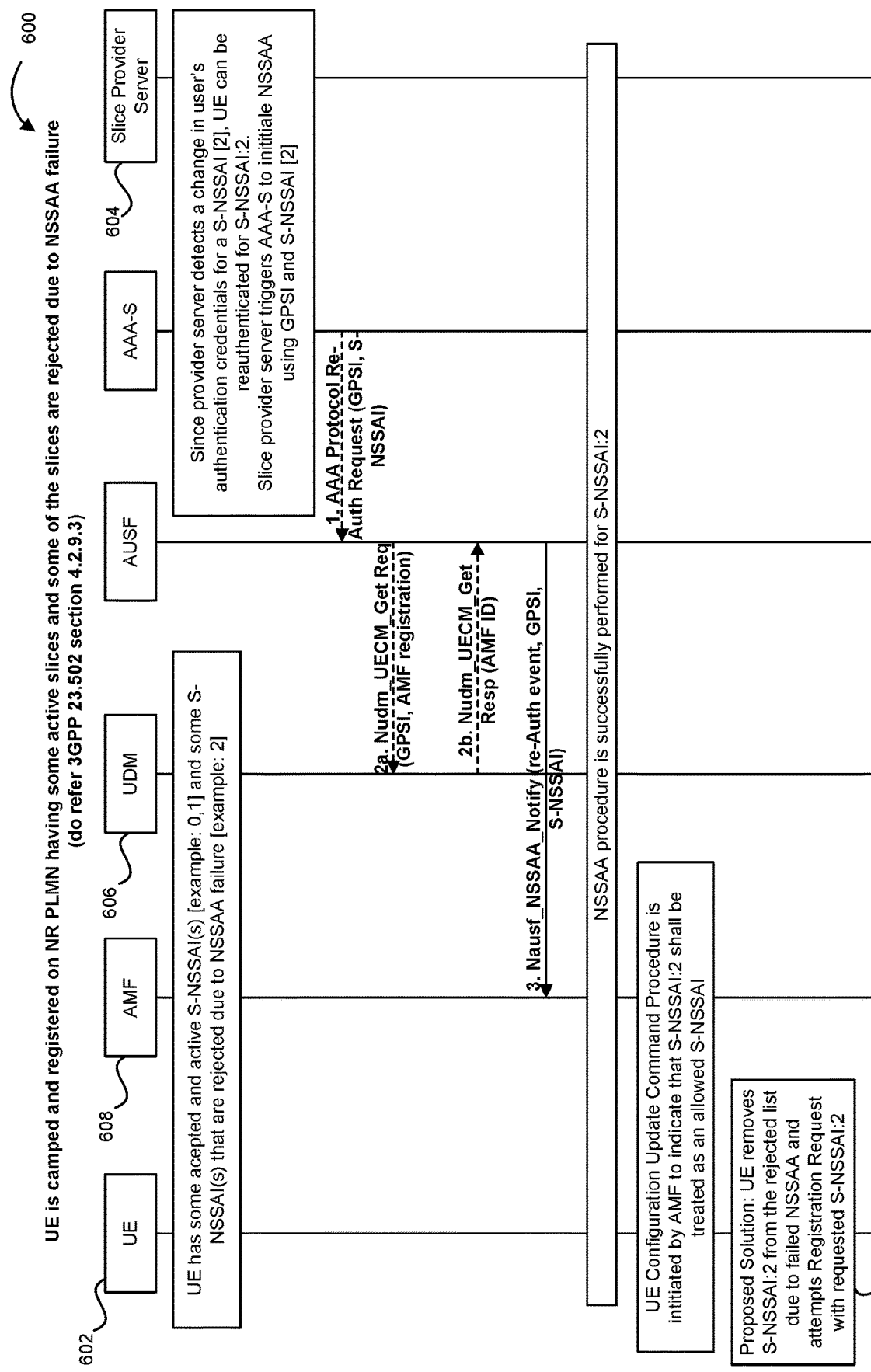
FIG. 6 illustrates a procedure for reauthentication if a specific slice that failed NSSAA earlier in accordance with one embodiment.

FIG. 6 shows another example scenario 600 in which the initial condition is that some of the requested S-NSSAIs by a UE 602 are rejected due to failure of NSSAA procedure. But UE 602 has some allowed S-NSSAIs that are active on the camped PLMN. FIG. 6 explains that a server 604 belonging to slice service provider is able to indicate to UDM 606 (via NEF) that a specific slice for UE 602 (identified by the GPSI) can be reactivated. UDM 606 will then indicate to serving AMF 608 about the change in allowed and rejected S-NSSAI(s) in CONFIGURATION UPDATE COMMAND, such that UE 602 is capable of triggering 610 a REG REQ. Thus, consistent with handling to be defined in 3GPP TS 24.501 and clarified in 3GPP TS 23.501 and 23.502, UE 602 can be reauthenticated if a specific slice failed NSSAA earlier since AMF 608 allows NSSAA for a specific S-NSSAI if it failed NSSAA earlier. UE 602 may then potentially access the specific slice controlled by NSSAA without reboot. This results in earlier access of the network slice for UE 602 as soon as it is made available.

The trigger in the aforementioned case concerning how UE 602 is indicated about the change is CONFIGURATION UPDATE COMMAND having (1) the previously rejected S-NSSAI (due to NSSAA failure) shown as allowed S-NSSAI and (2) a "registration requested" flag set in the configuration update indication. In other embodiments, it can be indicated in REGISTRATION ACCEPT as well (if NSSAA information changed and UE initiated REGISTRATION REQUEST). The network after REGISTRATION ACCEPT can indicate the previously rejected S-NSSAI (due to NSSAA failure) as pending and re-start the NSSAA procedure.

Another scenario arises when UE does not find service in N1 mode after UE's registration request is rejected with #62 "No network slices available" with S-NSSAI causes relating to—"S-NSSAI not available in the current PLMN or SNPN" or "S-NSSAI not available due to the failed or revoked network slice-specific authentication and authorization" for all possible requested S-NSSAIs in N1 mode. For instance: (1) UE attempts Registration Request with Requested S-NSSAIs {0,1} on a PLMN in N1 mode. (2) UE receives Registration Reject with #62 "No network slices available" with each of the requested S-NSSAI cause relating to—"S-NSSAI not available in the current PLMN or SNPN" or "S-NSSAI not available due to the failed or revoked network slice-specific authentication and authorization" for all requested S-NSSAIs. There is no other allowed, configured S-NSSAI remaining with the UE that it can use to attempt registration request on this PLMN. (3) UE as per current handling in 3GPP specification 24.501, moves to DEREGISTERED state and optionally performs a PLMN search. UE can find the same PLMN in LTE mode. (4) UE camps and registers on the same PLMN in LTE mode. (5) If SGCN belonging to the same PLMN detects a change in configured S-NSSAIs (new S-NSSAI:2 is added or previously failed NSSAA slice (e.g., S-NSSAI:1) has now detected a change in user's credentials for S-NSSAI:1), then UE will not be able to receive this indication when it is registered in LTE. Hence UE will remain camped on LTE even when it may be possible for it to receive service in N1 mode. Similarly, this scenario is possible when UE has moved to GSM, UMTS RAT on the same PLMN.

To address the aforementioned scenario, a new detach cause in network initiated Detach Request for S1 mode may be implemented that allows UDM to notify HSS about a need to perform a HSS initiated detach with a new cause. This allows a UE to be indicated that it can now camp back on N1 mode and re-attempt Registration Request after deleting all rejected S-NSSAIs for the PLMN. Similar concepts can be extended to GSM, UMTS as well. As per 3GPP specification 23.060-section 6.6.2.2 network initiated detach can be triggered by HLR. Hence after a service-based interface is defined between HLR and UDM this solution can be extended to GSM, UMTS as well. In LTE, it is possible to utilize the already defined service function—Nhss_UEContextManagement between UDM and HSS using an existing service operation—MmeDeregistration with a new deregistration reason for a specific UE.

As per current 3GPP specification 23.401-section 5.3.8.4, HSS can initiate a network initiated detach towards UE. UDM on determining that subscription parameters for a specific supported slice has changed, can notify to HSS to initiate a detach procedure using a new cause "#XX—Reattach in N1."

On receiving this new cause in LTE, UE will complete the detach procedure and enable N1 mode capabilities (if N1 mode capabilities were disabled earlier) and attempt to select the same PLMN in N1 mode. Before attempting initial registration, UE will delete all its rejected S-NSSAIs and derive the new requested S-NSSAIs from the configured NSSAI for the PLMN or the default configured NSSAI.

Figure 7:
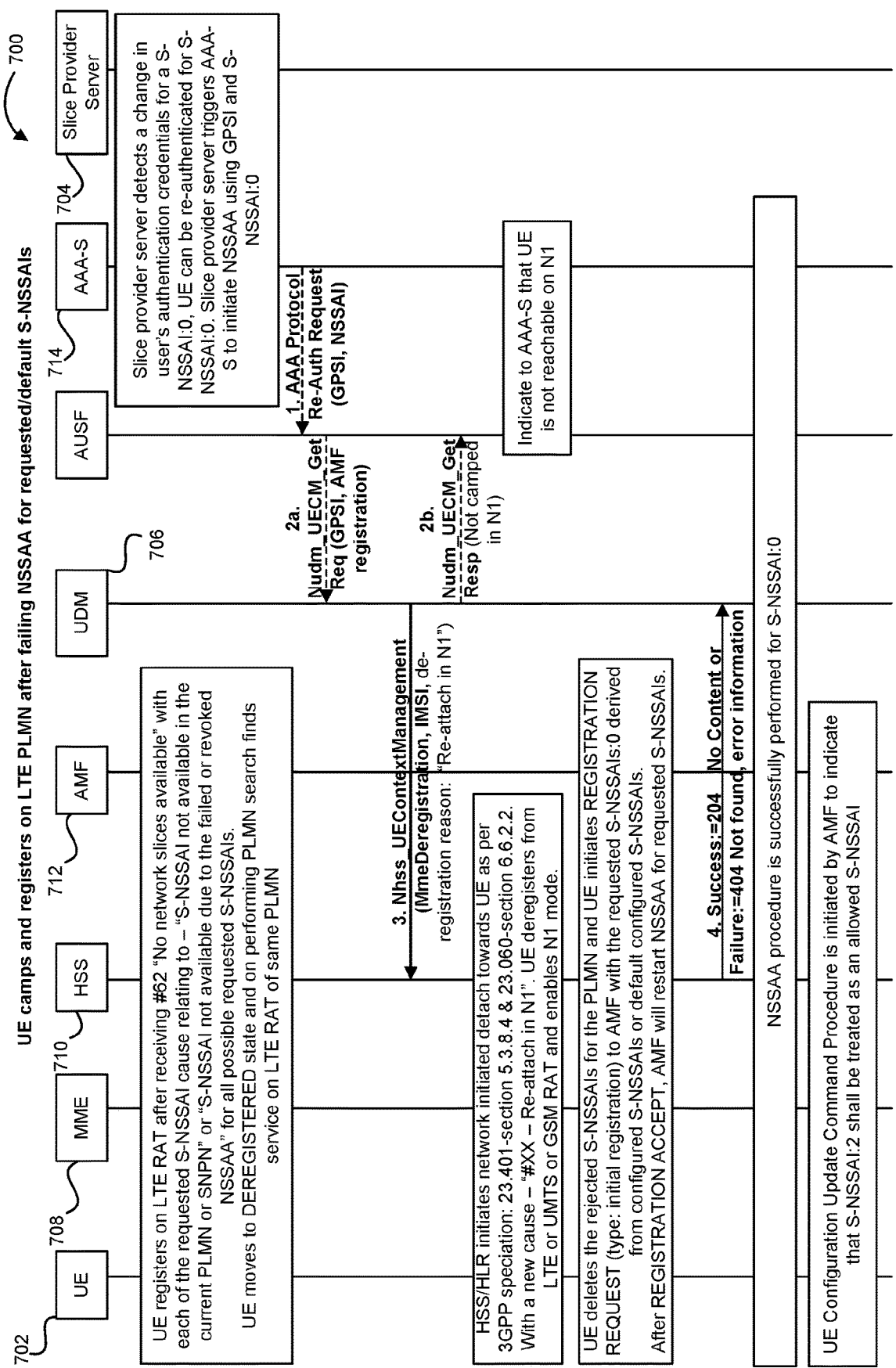
FIG. 7 illustrates a procedure for reattaching in N1 mode in accordance with one embodiment.

FIG. 7 shows another example scenario 700 in which the initial condition is that all of the requested S-NSSAIs by a UE 702 are rejected due to failure of NSSAA procedure. As noted above, after some time, if authentication and authorization parameters of a UE are modified at network side for the earlier rejected S-NSSAI due to NSSAA failure, then there is no way that the UE can be indicated about this change. Hence, the UE may not reattempt to activate the rejected S-NSSAIs and not able to activate any slice till reboot. The current handling as per specifications is that the UE will not come to know if there is a change in its subscription information which can allow it to access the specific rejected S-NSSAI with NSSAA again.

In contrast, FIG. 7 shows a server 704 belonging to slice service provider shall be able to indicate to UDM 706 (via NEF) that a specific slice for a UE (identified by the GPSI) can be reactivated. For instance, UDM 706 initiates S6a Cancel Location procedure towards MME 708 using the IMSI for UE 702 by sending a POST request (custom method: deregister-mme) to HSS/HLR 710. The request body contains UE 702 identity (IMSI) and a new deregistration reason: "Re-attach in N1." Thus, UDM 706, knowing that UE 702 is having no slice active due to NSSAA failure, indicates to HSS/HLR 710 that there is a change in UE slice authentication parameters and it is now allowed to attempt N1 mode camping and registration.

HSS/HLR 710, on receiving the request from UDM 706, starts a network initiated detach procedure as per 3GPP specification 23.401-section 5.3.8.4 with a new cause—"#XX—Re-attach in N1," if UE 702 is camped and registered on LTE, UMTS, GSM RATs on any PLMN (reference—23.060: 6.6.2.2, 24.301: 5.3.8.4). UE 702, on completing the detach procedure, reenables N1 mode capabilities (if the N1 mode capabilities were disabled).

If UE 702 is not registered in EPS network, then HTTP status code "404 Not Found" is returned including additional error information in the response body, according to some embodiments.

UE 702 deletes the rejected S-NSSAIs for the camped PLMN and attempts initial Registration Request procedure using the requested S-NSSAIs derived from configured NSSAI or from the default configured NSSAI.

Optionally, if UE 702 triggers an ATTACH REQ, ROUTING AREA UPDATE REQ, TRACKING AREA UPDATE REQ as it was out of coverage or UE 702 did not register with any network, then this new cause—"Re-attach in N1 mode" can be received in ATTACH REJ, ROUTING AREA UPDATE REJECT, TRACKING AREA UPDATE REJECT. While this flag is set in HLR/HSS/UDM (detach is pending), if UE attempts registration in 5G, then this flag shall be reset and authentication and authorization procedure within NSSAA for the requested slices will be carried out by AMF and the slice server In some embodiments, for the case that UE 702 remains camped on the same 5G PLMN in DEREGISTERED state, a timer is started in UE 702 (T3502 or a UE implementation specific timer). The timer value of this can be same as T3502 given by the network (if it is less than 1 hour duration) then it must be at least 1 hour or more. Alternatively, this timer can be provided by the slice server and indicated by AMF 712 in the Configuration Update Command while providing the rejected S-NSSAI list with cause—"S-NSSAI not available due to the failed or revoked network slice-specific authentication and authorization."

On the timer expiry, UE 702 will enable N1 mode capability and attempt registration on 5G PLMN (based on the priority mentioned 23.122). The REGISTRATION REQ will be sent with type initial and rejected S-NSSAIs with cause "S-NSSAI not available due to the failed or revoked network slice-specific authentication and authorization" will be sent in the requested S-NSSAIs.

If AMF 712 was indicated a change in slice specific authentication and authorization parameters earlier by UDM 706 or AAA-S 714, then AMF 712 will initiate the NSSAA procedure again with AAA-S 714, or else it will send the REGISTRATION ACCEPT with the same rejected S-NSSAI list and cause (implying there is no change in the authentication credentials for UE 702). UE 702 can either return to the same PLMN-RAT combination if REGISTRATION ACCEPT is received with all requested S-NSSAIs are rejected with NSSAA failure and continue receiving the service and re-start the proposed timer. The timer based approach to this problem will ensure that UE 702 keeps re-checking with network periodically if the slice is accessible to it now after its authentication credentials are enabled, In other embodiments, as an alternative to a timer based solution, UE 702 on registering on any PLMN on LTE, UMTS, GSM will keep running the above timer, and on its expiry, UE 702 will enable N1 mode capability and attempt PLMN selection as per 23.122.

Figure 8:
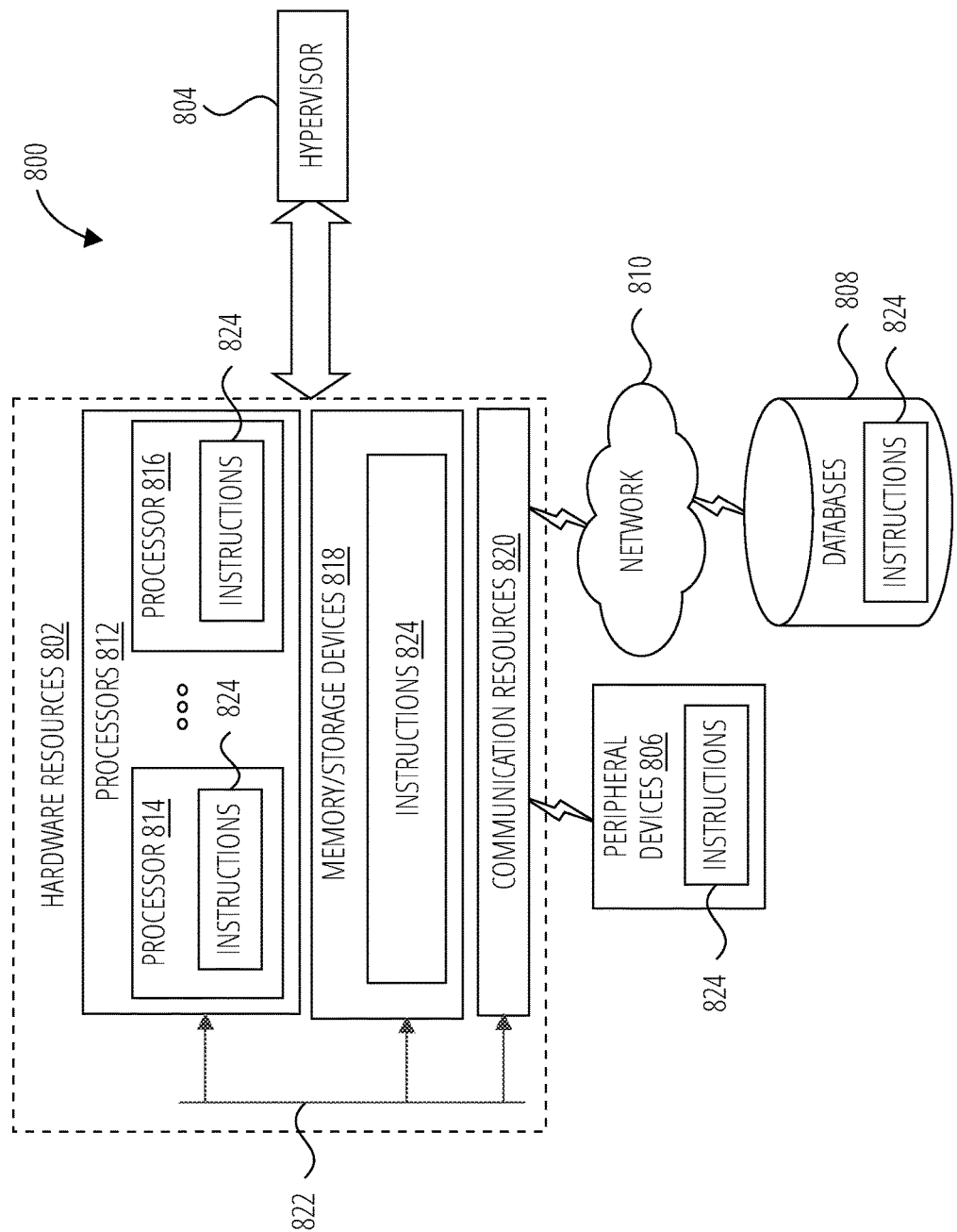
FIG. 8 illustrates components in accordance with one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a User Equipment (UE) camped on a Fifth Generation (5G) Public Land Mobile Network (PLMN) that includes a New Radio (NR) Radio Access Technology (RAT), of avoiding wireless communications service disruptions attributable to rejection of each Single Network Slice Selection Assistance Information (S-NSSAI), the method comprising: receiving an indication that no network slices are available; deactivating N1 mode capability; and searching for service on a PLMN that includes a non-NR RAT.

Example 2 is the method of Example 1, in which the indication is a deregistration request for Network Slice Specific Authentication and Authorization (NSSAA) failure.

Example 3 is the method of Example 2, further comprising attempting Long-Term Evolution (LTE) service on the 5G PLMN that includes the NR RAT through which all S-NSSAIs have failed due to the NSSAA failure.

Example 4 is the method of Example 1, in which the indication is a registration rejection for all requested S-NSSAIs.

Example 5 is the method of Example 1, further comprising receiving redirection information to fallback to a Long-Term Evolution (LTE) RAT.

Example 6 is the method of Example 1, in which the non-5G PLMN includes a non-3GPP network having Evolved Packet Core (EPC) core network support.

Example 7 is a non-transitory computer-readable storage medium, the computer-readable storage medium including instructions that when executed by a computer, cause the computer to: in response to rejection of each Single Network Slice Selection Assistance Information (S-NSSAI), receive an indication that no network slices are available for a User Equipment (UE) camped on a Fifth Generation (5G) Public Land Mobile Network (PLMN) that includes a New Radio (NR) Radio Access Technology (RAT); deactivate N1 mode capability; and search for service on a PLMN that includes a non-NR RAT so as to avoid wireless communications service disruptions.

Example 8 is the computer-readable storage medium of Example 7, in which the indication is a deregistration request for Network Slice Specific Authentication and Authorization (NSSAA) failure.

Example 9 is the computer-readable storage medium of Example 8, wherein the instructions further configure the computer to attempt Long-Term Evolution (LTE) service on the 5G PLMN that includes the NR RAT through which all S-NSSAIs have failed due to the NSSAA failure.

Example 10 is the computer-readable storage medium of Example 7, in which the indication is a registration rejection for all requested S-NSSAIs.

Example 11 is the computer-readable storage medium of Example 7, wherein the instructions further configure the computer to receive redirection information to fallback to a Long-Term Evolution (LTE) RAT.

Example 12 is the computer-readable storage medium of Example 7, in which the non-5G PLMN includes a non-3GPP network having Evolved Packet Core (EPC) core network support.

Example 13 is a method, performed by a User Equipment (UE), of attempting to maintain continuity of existing Protocol Data Unit (PDU) sessions on N1 mode, the method comprising: obtaining active slices by authenticating them using Network Slice Specific Authentication and Authorization (NSSAA) procedure on a Fifth Generation (5G) New Radio (NR) roaming Public Land Mobile Network (PLMN); and in response to a loss of coverage on the 5G NR roaming PLMN, searching for another 5G roaming PLMN before searching a Long-Term Evolution (LTE) PLMN to attempt to maintain the active slices.

Example 14 is the method of Example 13, further comprising searching the LTE PLMN for service in response to determining no other 5G roaming PLMN is available.

Example 15 is a non-transitory computer-readable storage medium, the computer-readable storage medium including instructions that when executed by a computer, cause the computer to: authenticate slices using Network Slice Specific Authentication and Authorization (NSSAA) procedure on a Fifth Generation (5G) New Radio (NR) roaming Public Land Mobile Network (PLMN); and in response to a loss of coverage on the 5G NR roam PLMN, searching for another 5G roaming PLMN before searching a Long-Term Evolution (LTE) PLMN to attempt to maintain the slices.

Example 16 is the computer-readable storage medium of Example 15, wherein the instructions further configure the computer to search the LTE PLMN for service in response to determining no other 5G roaming PLMN is available.

Example 17 is a method, performed by a User Equipment (UE), of accessing without a reboot a network slice that has been previously rejected in connection with a Network Slice Specific Authentication and Authorization (NSSAA) procedure, the method comprising: receiving an indication of a rejected Single Network Slice Selection Assistance Information (S-NSSAI); and attempting the NSSAA procedure again for the rejected S-NSSAI based on a change in authentication credentials.

Example 18 is the method of Example 17, in which the indication is received through an N1 interface between the UE and an Access and Mobility Management Function (AMF).

Example 19 is the method of Example 18, in which the indication is a Configuration Update Command indicating that the rejected S-NSSAI is to be treated as an allowed S-NSSAI.

Example 20 is the method of Example 19, in which the Configuration Update Command includes a registration requested flag set.

Example 21 is the method of Example 17, in which no network slices are available for the UE and the indication is initiated from a Home Subscriber Server (HSS).

Example 22 is the method of Example 17, in which no network slices are available, and the method further comprises: deregistering from non-Fifth Generation (5G) Radio Access Technology (RAT); and enabling N1 mode for initiating the registration request.

Example 23 is the method of Example 22, further comprising performing a PLMN search with N1 mode enabled so as to find a New Radio (NR) RAT in a Public Land Mobile Network (PLMN) that includes the non-5G RAT.

Example 24 is the method of Example 17, further comprising: starting a timer while the UE is in a deregistered state on a Fifth Generation (5G) Public Land Mobile Network (PLMN) associated with the rejected S-NSSAI; and in response to expiration of the timer, enabling N1 mode for initiating the registration request.

Example 25 is the method of Example 24, further comprising: maintaining the timer upon registering on any non-5G PLMN; and in response to expiration of the timer, attempting PLMN selection.

Example 26 is a non-transitory computer-readable storage medium, the computer-readable storage medium including instructions that when executed by a computer, cause the computer to: receive an indication of a rejected Single Network Slice Selection Assistance Information (S-NSSAI); and generate a message to attempt the NSSAA procedure again for the rejected S-NSSAI so as to access without a reboot a network slice that was previously rejected in connection with a Network Slice Specific Authentication and Authorization (NSSAA) procedure.

Example 27 is the computer-readable storage medium of Example 26, in which the indication is received through an N1 interface between a UE and an Access and Mobility Management Function (AMF).

Example 28 is the computer-readable storage medium of Example 27, in which the indication is a Configuration Update Command indicating that the rejected S-NSSAI is to be treated as an allowed S-NSSAI.

Example 29 is the computer-readable storage medium of Example 28, in which the Configuration Update Command includes a registration requested flag set.

Example 30 is the computer-readable storage medium of Example 26, in which the indication is initiated from a Home Subscriber Server (HSS).

Example 31 is the computer-readable storage medium of Example 26, in which the instructions further configure the computer to: deregister from non-Fifth Generation (5G) Radio Access Technology (RAT); and enable N1 mode for initiating the registration request.

Example 32 is the computer-readable storage medium of Example 31, wherein the instructions further configure the computer to perform a PLMN search with N1 mode enabled so as to find a New Radio (NR) RAT in a Public Land Mobile Network (PLMN) that includes the non-5G RAT.

Example 33 is the computer-readable storage medium of Example 26, wherein the instructions further configure the computer to: start a timer while the UE is in a deregistered state on a Fifth Generation (5G) Public Land Mobile Network (PLMN) associated with the rejected S-NSSAI; and in response to expiration of the timer, enable N1 mode for initiating the registration request.

Example 34 is the computer-readable storage medium of Example 33, wherein the instructions further configure the computer to: maintain the timer upon registering on any non-5G PLMN; and in response to expiration of the timer, attempt PLMN selection.

Example 35 is a method, performed by a server in a in a Public Land Mobile Network (PLMN), of facilitating a registration request for a network slice that has been previously rejected in connection with a Network Slice Specific Authentication and Authorization (NSSAA) procedure, the method comprising: in response to a change in authentication credentials, receiving an indication that a rejected Single Network Slice Selection Assistance Information (S-NSSAI) associated with a User Equipment (UE) can be reactivated; and generating a message to cause the UE to initiate a registration request for the rejected S-NSSAI.

Example 36 is the method of Example 35, in which the server acts as Unified Data Management (UDM).

Example 37 is the method of Example 35, in which the server acts as an Access and Mobility Management Function (AMF).

Example 38 is the method of Example 35, in which the server acts as a Home Subscriber Server (HSS).

Example 39 is a non-transitory computer-readable storage medium, the computer-readable storage medium including instructions that when executed by a processor if a server, cause the processor to: in response to a change in authentication credentials, receive an indication that a rejected Single Network Slice Selection Assistance Information (S-NSSAI) associated with a User Equipment (UE) can be reactivated; and generate a message to cause the UE to initiate a registration request for the rejected S-NSSAI.

Example 40 is the computer-readable storage medium of Example 39, in which the server acts as Unified Data Management (UDM).

Example 41 is the computer-readable storage medium of Example 39, in which the server acts as an Access and Mobility Management Function (AMF).

Example 42 is the computer-readable storage medium of Example 39, in which the server acts as a Home Subscriber Server (HSS).

Example 43 may include an apparatus comprising means to perform one or more elements of a method described in or related to any of the above Examples, or any other method or process described herein.

Example 44 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 45 may include an apparatus comprising logic, modules, or circuitry to perform one or more elements of a method described in or related to any of the above Examples, or any other method or process described herein.

Example 46 may include a method, technique, or process as described in or related to any of the above Examples, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 48 may include a signal as described in or related to any of the above Examples, or portions or parts thereof.

Example 49 may include a datagram, packet, frame, segment, protocol data unit (PDU), or message as described in or related to any of the above Examples, or portions or parts thereof, or otherwise described in the present disclosure.

Example 50 may include a signal encoded with data as described in or related to any of the above Examples, or portions or parts thereof, or otherwise described in the present disclosure.

Example 51 may include a signal encoded with a datagram, packet, frame, segment, PDU, or message as described in or related to any of the above Examples, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 53 may include a computer program comprising instructions, wherein execution of the program by a processing element is to cause the processing element to carry out the method, techniques, or process as described in or related to any of the above Examples, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a User Equipment (UE) camped on a Fifth Generation (5G) Public Land Mobile Network (PLMN) that includes a New Radio (NR) Radio Access Technology (RAT), of avoiding wireless communications service disruptions attributable to rejection of each Single Network Slice Selection Assistance Information (S-NSSAI), the method comprising:
 receiving an indication that no network slices are available;
 deactivating N1 mode capability based on the indication that no network slices are available; and
 searching for service on a PLMN that includes a non-NR RAT.

2. The method of claim 1, in which the indication is a deregistration request for Network Slice Specific Authentication and Authorization (NSSAA) failure.

3. The method of claim 2, further comprising attempting Long-Term Evolution (LTE) service on the 5G PLMN that includes the NR RAT through which all S-NSSAIs have failed due to the NSSAA failure.

4. The method of claim 1, in which the indication is a registration rejection for all requested S-NSSAIs.

5. The method of claim 1, further comprising receiving redirection information to fallback to a Long-Term Evolution (LTE) RAT.

6. The method of claim 1, in which the non-5G PLMN includes a non-3GPP network having Evolved Packet Core (EPC) core network support.

7. A non-transitory computer-readable storage medium, the computer-readable storage medium including instructions that when executed by a computer, cause the computer to:
 in response to rejection of each Single Network Slice Selection Assistance Information (S-NSSAI), receive an indication that no network slices are available for a User Equipment (UE) camped on a Fifth Generation (5G) Public Land Mobile Network (PLMN) that includes a New Radio (NR) Radio Access Technology (RAT);
 deactivate N1 mode capability based on the indication that no network slices are available; and
 search for service on a PLMN that includes a non-NR RAT so as to avoid wireless communications service disruptions.

8. The computer-readable storage medium of claim 7, in which the indication is a deregistration request for Network Slice Specific Authentication and Authorization (NSSAA) failure.

9. The computer-readable storage medium of claim 8, wherein the instructions further configure the computer to attempt Long-Term Evolution (LTE) service on the 5G PLMN that includes the NR RAT through which all S-NSSAIs have failed due to the NSSAA failure.

10. The computer-readable storage medium of claim 7, in which the indication is a registration rejection for all requested S-NSSAIs.

11. The computer-readable storage medium of claim 7, wherein the instructions further configure the computer to receive redirection information to fallback to a Long-Term Evolution (LTE) RAT.

12. The computer-readable storage medium of claim 7, in which the non-5G PLMN includes a non-3GPP network having Evolved Packet Core (EPC) core network support.

13. A method, performed by a User Equipment (UE), of attempting to maintain continuity of existing Protocol Data Unit (PDU) sessions on N1 mode, the method comprising:
- obtaining active slices by authenticating them using Network Slice Specific Authentication and Authorization (NSSAA) procedure on a Fifth Generation (5G) New Radio (NR) roaming Public Land Mobile Network (PLMN); and
- in response to a loss of coverage on the 5G NR roaming PLMN, searching for another 5G roaming PLMN that is different than the 5G NR roaming PLMN where the active slices were authenticated before searching a Long-Term Evolution (LTE) PLMN to attempt to maintain the active slices.

14. The method of claim 13, further comprising searching the LTE PLMN for service in response to determining no other 5G roaming PLMN is available.

* * * * *